United States Patent [19]
Fishman

[11] Patent Number: 6,077,144
[45] Date of Patent: Jun. 20, 2000

[54] LOLLIPOP HOLDER WITH RANDOM DISPLAY

[75] Inventor: John D. Fishman, Cranston, R.I.

[73] Assignee: Toycept, Inc., Cranston, R.I.

[21] Appl. No.: 09/336,231

[22] Filed: Jun. 18, 1999

[51] Int. Cl.[7] .................................................. A63H 1/00
[52] U.S. Cl. ............................................. 446/236; 40/442
[58] Field of Search .................................... 446/236, 266, 446/484, 485; 362/109; 40/442, 452, 902

[56] References Cited

U.S. PATENT DOCUMENTS

| | | | |
|---|---|---|---|
| 5,209,692 | 5/1993 | Coleman et al. | 446/71 |
| 5,324,527 | 6/1994 | Coleman | 426/134 |
| 5,471,373 | 11/1995 | Coleman et al. | 362/109 |
| 5,690,535 | 11/1997 | Coleman et al. | 446/236 |
| 5,733,033 | 3/1998 | Coleman et al. | 362/109 |

OTHER PUBLICATIONS

Cap Candy™ Product Brochure, OddzOn Products, Inc., undated prior art.

*Primary Examiner*—Robert A. Hafer
*Assistant Examiner*—Urszula Cegielnik
*Attorney, Agent, or Firm*—Marshall, O'Toole, Gerstein, Murray & Borun

[57] ABSTRACT

The invention is directed to a candy holding device for holding a piece of candy and displaying a random message in response to a movement of the candy. The candy holding device includes a housing having a message display portion, a source of battery power disposed within the housing, a holder disposed within the housing and adapted to hold the stick, a switch disposed within the housing and adjacent to the stick such that a movement of the stick causes an actuation of the switch, and an electronic circuit coupled to the battery and the switch. The circuit is adapted to randomly select in the message display portion one from a plurality of messages in response to the actuation of the switch.

20 Claims, 4 Drawing Sheets

LOLLIPOP HOLDER WITH RANDOM DISPLAY

BACKGROUND OF THE INVENTION

The present invention relates generally to a candy holding device, and more particularly to a lollipop holder, or fortune pop, that is designed to display a random message in response to a movement of the lollipop.

Various types of lollipop holders have been previously designed. For example, U.S. Pat. Nos. 5,471,373 and 5,733,033, both to Coleman et al., disclose battery operated lollipop holders having a plurality of push-button type switches mounted to a housing that may be actuated by a user's hand during consumption of the lollipop to produce a variety of entertaining sounds and light flashes.

SUMMARY OF THE INVENTION

The invention is directed to a candy holding device for holding a piece of candy and displaying a random message in response to a movement of the candy. The candy holding device includes a housing having a message display portion with a plurality of messages associated therewith, a source of battery power disposed within the housing, a holder coupled to the housing and adapted to hold the stick, a switch coupled to the housing such that a movement of the stick causes an actuation of the switch, and an electronic circuit coupled to the battery and the switch, wherein the circuit randomly selects in the message display portion one of the messages in response to the actuation of the switch.

The candy holding device may further include a speaker to produce sounds in response to the actuation of the switch. The message display portion may be oriented toward a user's face during consumption of the candy and may include a plurality of message windows and at least some of the message windows may include a textual message.

The features and advantages of the invention will be apparent to those of ordinary skill in the art in view of the detailed description of the preferred embodiment, which is made with reference to the drawings, a brief description of which is provided below.

DETAILED DESCRIPTION OF A PREFERRED EMBODIMENT

Figure 1:
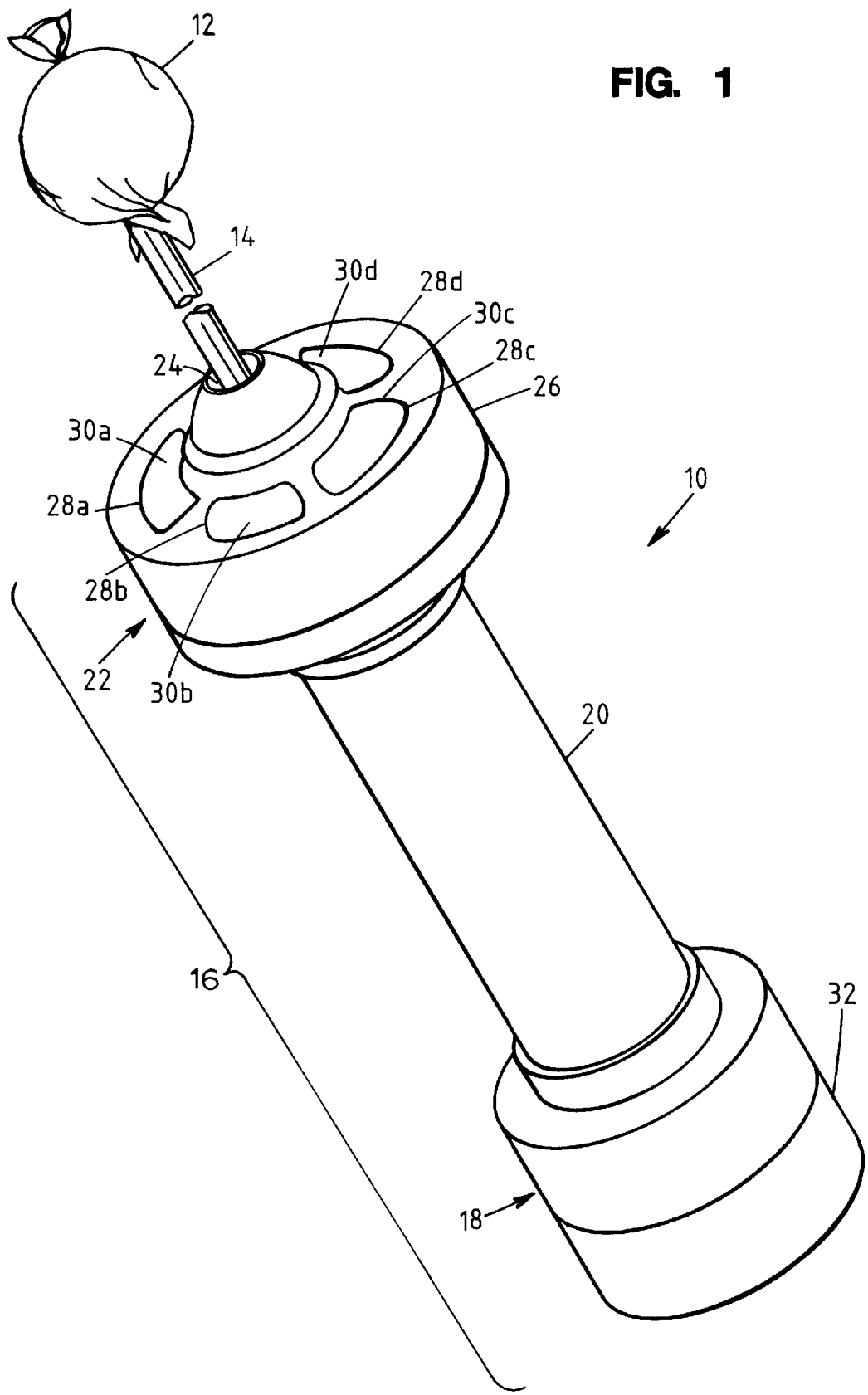
FIG. 1 illustrates a perspective view of an embodiment of a candy holding device in accordance with the invention.

FIG. 1 illustrates a perspective view of an embodiment of a candy holding device 10 in accordance with the invention. The candy holding device 10 is adapted to hold a piece of candy 12 on a stick 14 and includes a housing 16 having a bottom portion 18, a handle portion 20, and a message display portion 22. A user inserts the stick 14 through an aperture 24 of the message display portion 22 and into a holder 34 (FIG. 3) that captures and retains the stick 14 and candy 12 so that the stick 14 is coaxially aligned with the aperture 24.

The housing 16 may be composed of one or more component parts that are made of a thermoplastic plastic or any other suitable material and that are designed for press-fit and/or snap-fit assembly to keep costs low. Alternatively, the housing 16 may be a substantially unitary structure or may have a plurality of component parts that are assembled using fast-cure adhesives, ultrasonic welds and/or other similar or equivalent fastening techniques that are commonly known in the art.

Figure 2:
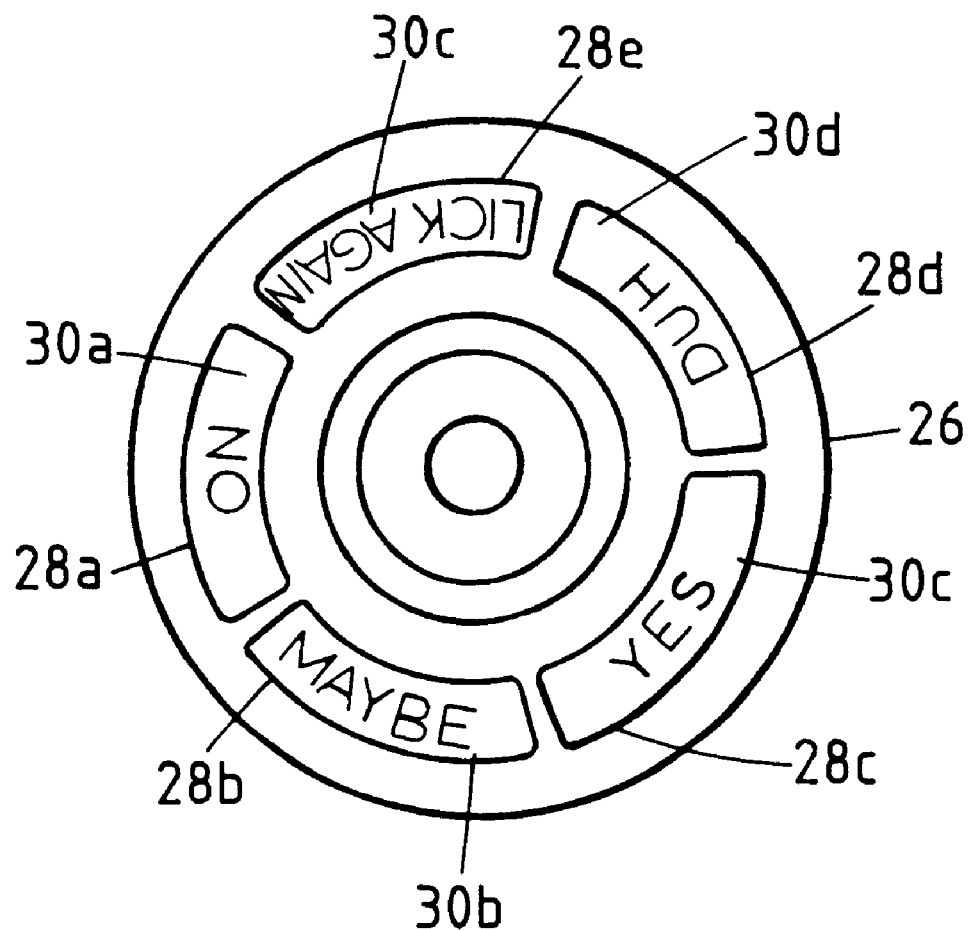
FIG. 2 is a plan view of the candy holding device shown in FIG. 1 showing some possible exemplary messages that may be provided by the display head.

The message display portion 22 includes a display head 26 having a plurality of message windows 28a–e (message window 28e is shown in FIG. 2). The message windows 28a–e face the candy 12 and are radially spaced around a circumference of the message display head 26 so that the user may easily view their contents during consumption of the candy 12. The message windows 28a–e include message lenses 30a–e (message lens 30e is shown in FIG. 2) that are made of a translucent material, such as die-cut Mylar, for example, and are screen printed with textual or other types of graphic message information. Thus, each of the lenses 30a–e may provide a different illuminated message, such as, for example, those shown in FIG. 2, when light is passed through the lens toward the user.

The handle portion 20 of the housing 16 is dimensioned to comfortably accommodate the hand of a child and may be generally cylindrical in shape or may have a more complex geometry to achieve a desired aesthetic and/or ergonomic quality. The bottom portion 18 of the housing 16 includes a removable end cap 32 that provides access to the interior of the housing 16 to facilitate assembly of the device 10, replacement of batteries, etc. The end cap 32 may be threadably engaged with the bottom portion 18 or may be designed to mate with the bottom portion 18 using a snap-fit and/or press-fit arrangement.

Figure 3:
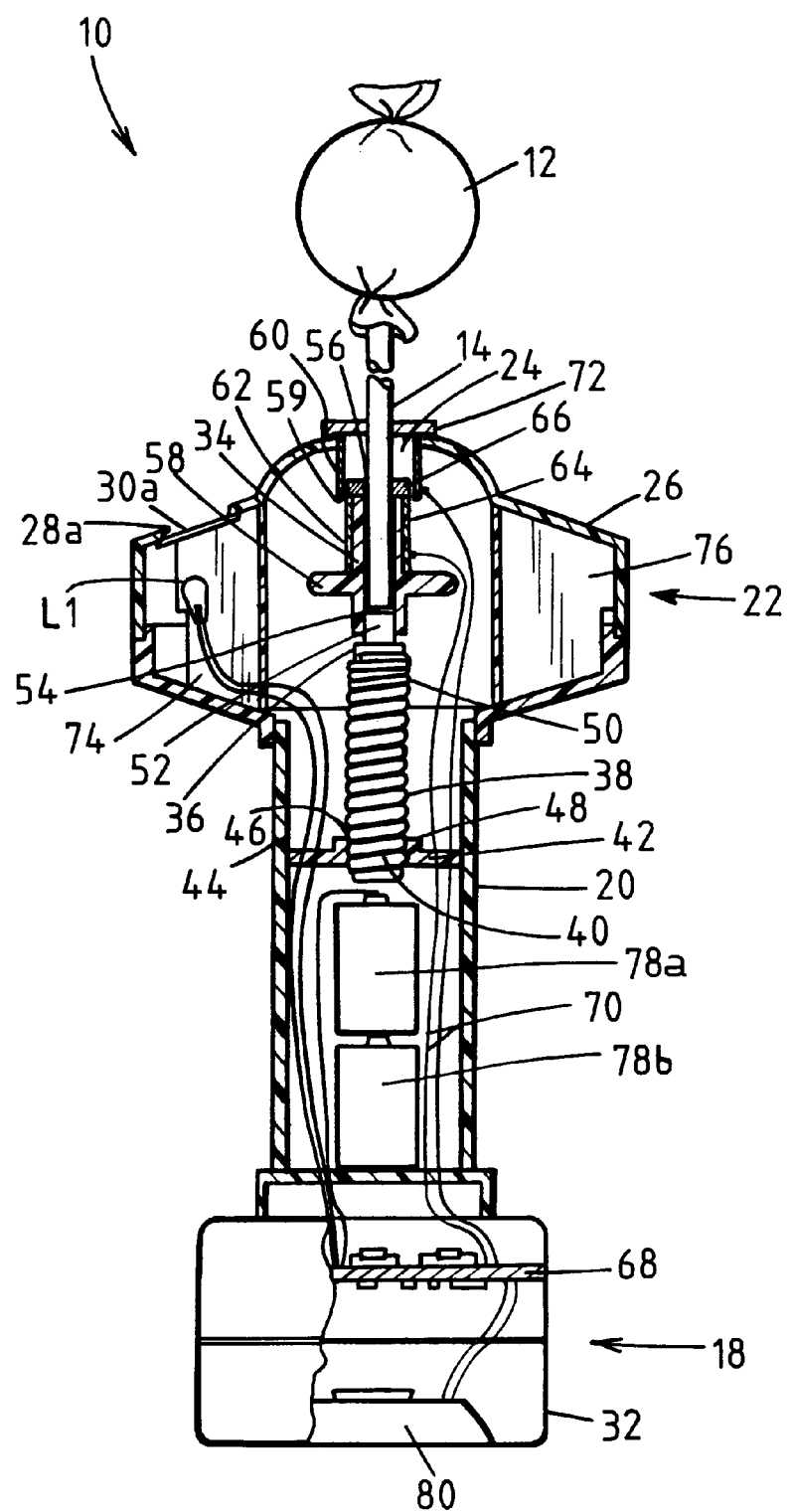
FIG. 3 is a side elevational view, partially in section, of the candy holding device shown in FIG. 1.

FIG. 3 is a side elevational view, partially in section, of the candy holding device 10 shown in FIG. 1. The holder 34 is urged into coaxial alignment with the aperture 24 in the message display head 26 via a post 36 and spring 38. A lower end 40 of the spring 38 is rigidly attached to a spring mount 42 that may be integrally formed within the handle portion 20 of the housing 16, or which may be a separate component that is rigidly attached to the inner wall 44 of the housing 16. In any case, the lower end 40 of the spring 38 passes through a mounting hole 46 that maintains the lower end 40 of the spring 38 in coaxial alignment with the aperture 24 of the message display head 26. While FIG. 3 illustrates the spring 38 to be a helical expansion spring, a variety of spring types such as a helical compression spring or a torsion spring could be substituted to achieve a similar result.

The lower end 40 of the spring 38 may be threadably engaged with the mounting hole 46 or may be press-fit into the mounting hole 46. Additionally, a shouldered portion 48 of the mounting plate 42 may be heat staked (if the mounting plate is made from a thermoplastic material) or peened to the lower end 40 of the spring 38 to further secure the lower end 40 and to prevent the spring 38 from rotating in the mounting plate 42.

The post 36 is captured by an upper end 50 of the spring 38 and may extend either partially or entirely through the interior of the spring 38 and includes a pin portion 52 that is pressed into a bore 54 in the holder 34. Thus, when the spring 38 is in a relaxed state, the holder 34 is held in coaxial alignment with the aperture 24 of the display head 26.

The bore 54 of the holder 34 is dimensioned to frictionally engage the stick 14 to retain the stick 14 and candy 12 during consumption by the user. To facilitate insertion of the stick 14 into the bore 54, a lead-in or chamfer 56 may be formed on the inner circumference of the bore 54. The holder 34 also includes a stop portion 58 that abuts a lower portion 59 of an outer contact ring 60 to prevent over-extension of the spring 38 and/or excessive forces from being applied to the holder 34, the post 36, and the mounting plate 42 when the user removes the stick 14 from the device 10.

An inner conductive contact 62 is rigidly attached to the holder 34 and may be formed as a metallic sleeve, ring, or cylinder that is pressed onto the holder 34. The inner surface 63 of the outer contact ring 60 and the outer surface 64 of the inner contact 62 are at least partially coextensive. Additionally, the inner diameter of the outer contact ring 60 is larger than the outer diameter of the inner contact 62 so that a gap 66 exists between the contact surfaces 63, 64 when the spring 38 is in a relaxed condition and the holder 34 and stick 14 are coaxially aligned with the aperture 24 of the display head 26. The contacts 60, 62 may be made of brass or any other suitable contact material. A contact cover 72 covers a substantial portion of the aperture 24 to prevent saliva and other fluids or debris from contaminating the contacts 60, 62.

The inner contact 62 and outer contact 60 provide a single-pole single-throw (SPST) switch input to an electronic circuit 68 via switch lead wires 70. As can be seen in FIG. 3, applying a lateral force to the candy 12 will tend to move the stick 14 and holder 34 so that the inner contact 62 engages the outer contact 60, thereby providing a switch closure input to the electronic circuit 68. Conversely, when the lateral force is removed, the spring 38 urges the stick 14 and holder 34 into coaxial alignment with the aperture 24 so that the inner contact 62 is disengaged (i.e., spaced apart) from the outer contact 60 by the gap 66.

The display head 26 includes a plurality of light baffles, two of which are shown at reference numerals 74 and 76. The light baffles divide the interior volume of the display head 26 into separate chambers that are each associated with a light source (one of which is shown as L1) and one of the message windows 28a–e and lenses 30a–e. The light baffles act as shields to prevent each of the light sources from simultaneously illuminating more than one message. Namely, when a light source is illuminated, the light baffles effectively contain the light it provides to illuminate the single message lens associated with it.

The electronic circuit 68 is mounted inside the bottom portion 18 of the housing 16 and is connected via wires to the light sources L1–L5 (FIG. 4) in the display head 26, the contacts 60, 62, a pair of series connected batteries 78a–b in the handle portion 20, and a speaker 80 mounted in the end cap 32. The electronic circuit 68 may be fabricated using a variety of known printed circuit and component technologies including through-hole, surface mount, hybrid, wire-bonded die-down, etc. without departing from the scope of the invention.

Figure 4:
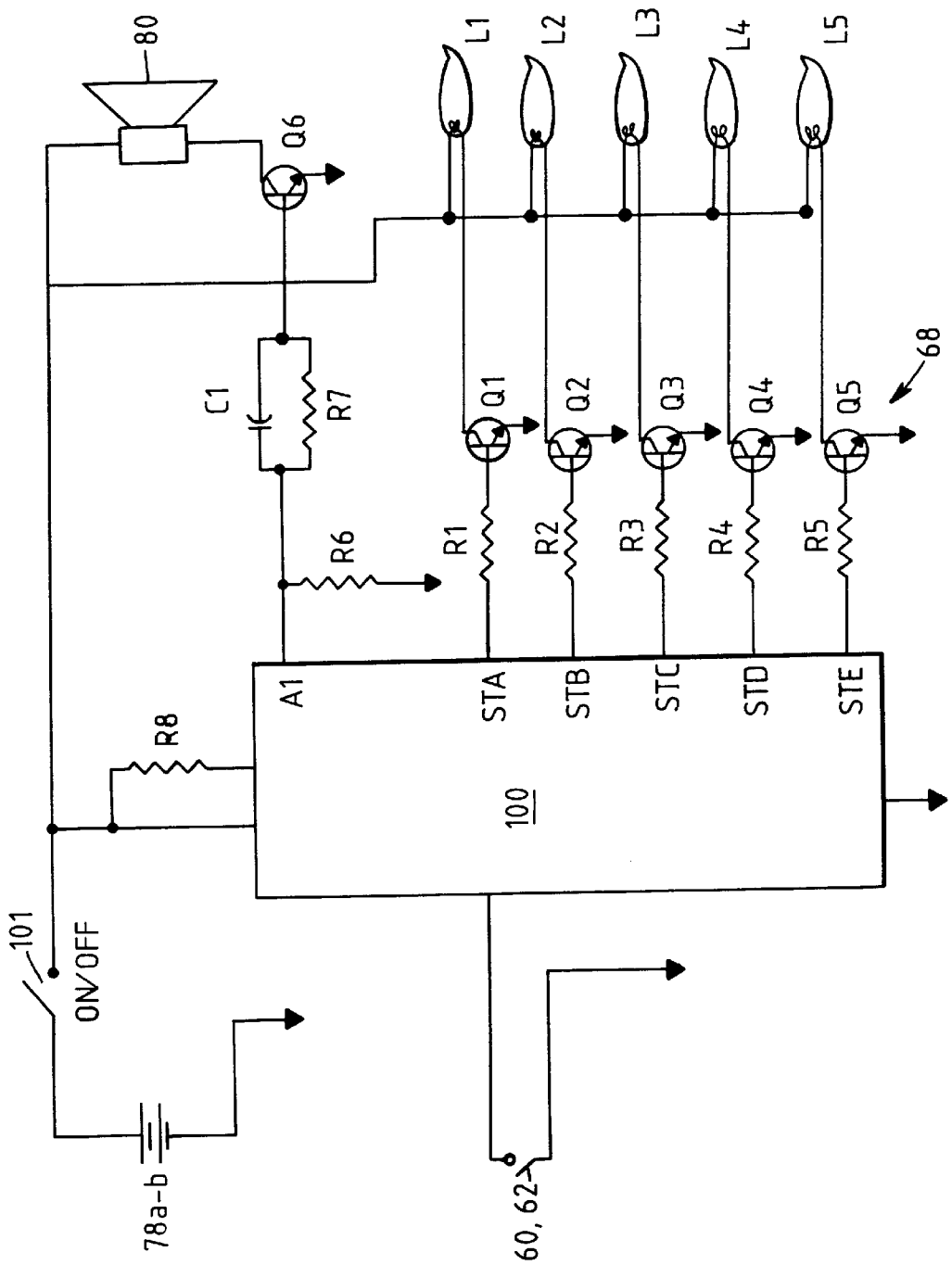
FIG. 4 is a schematic diagram representing the electronic control circuit shown in FIG. 3.

FIG. 4 is a schematic diagram representing the electronic control circuit 68 shown in FIG. 3. The circuit 68 receives power from the batteries 78a–b through an on/off switch 101, and a SPST switch input from the contacts 60, 62 and provides drive signals to the light sources L1–L5 and the speaker 80. A light/sound synthesizer integrated circuit (IC) 100, such as the commercially available Windbond W528101 processor, is responsive to the contacts 60, 62 to generate a random or pseudo-random sequence of digital pulses on light driver output ports STA through STE and audio waveforms on audio output port Al of the synthesizer IC 100.

The pulses on the light driver ports STA–STE feed through drive resistors R1–R5, which are connected to the base terminals of drive transistors Q1–Q5. The drive transistors Q1–Q5 are connected in an open collector configuration to the light sources L1–L5, that may be, for example, grain-of-wheat type incandescent bulbs. A high-level pulse output on any one of the light driver ports STA–STE will provide a current through the corresponding one of the drive resistors R1–R5 to turn on a corresponding one of the drive transistors Q1–Q5, thereby allowing current to flow through the corresponding light source to illuminate it.

The audio waveforms on the audio output port Al pass through a filter network formed by resistors R6, R7 and capacitor C1 to drive the base terminal of transistor Q6. Transistor Q6 is connected to the speaker 80 in an open collector configuration. The speaker 80 may be a conventional permanent magnet/moving coil type or a piezo-type may be used to further reduce power consumption and costs.

In operation, as the user consumes (i.e., licks) the candy 12, lateral forces are imparted to the candy 12 which move the stick 14 out of coaxial alignment with the aperture 24. If the lateral forces are sufficient, the contacts 60, 62 will engage and provide a SPST switch closure input to the synthesizer IC 100. In response to receiving the SPST switch closure, the synthesizer executes a "random" message display sequence that provides a "fortune telling" function. A "random" display sequence includes truly random, pseudo-random, or any other type of display sequence that cannot easily be recognized and/or predicted by the user.

In a "thinking" phase of the fortune telling function, the synthesizer 100 provides appropriate drive signals on the light driver ports STA–STE to sequentially and randomly illuminate a plurality of the light sources L1–L5 and provides audio signals on the audio port A1 to drive the speaker 80. While each of the light sources is momentarily illuminated, the corresponding one of the lenses 30a–e in the message windows 28a–e (FIGS. 1, 2, and 3) passes light toward the user's face, thereby illuminating the message on the lens. At the same time messages are being illuminated, the speaker produces complementary sounds or musical tones.

In general, the thinking phase, which may last approximately five seconds, appears to the user consuming the candy 12 to be a random sequence of flashing lights/messages that are accompanied by musical sounds. In particular, a specific type of illumination and sound sequence may be used to achieve a desired entertainment quality. For instance, a "roulette wheel" light sequence may be accompanied by a "thinking sound." The roulette wheel light sequence may be implemented by flashing successively smaller groups of light sources over the five second fortune telling interval and at the same time increasing the duration of illumination of each light source as the group size decreases. For example, during the first second four light sources may be rapidly sequentially illuminated in a random fashion, during the second second three light sources may be sequentially illuminated (now less rapidly than in the preceding second) in a random fashion, and so on until the thinking phase is complete.

An answer phase follows the fortune telling phase of the fortune telling function. During the answer phase, the last message illuminated during the fortune telling phase is held on for an extended period of time (e.g., five seconds) so that a child can easily read the illuminated message lens. In addition, the answer phase may include an answer sound such as "TA DAAA," or other similar sounds clearly indicating the presentation of an answer/fortune. The answer phase may, for example, last approximately five seconds.

Once the above-described fortune telling function has been initiated by a SPST switch closure input, subsequent switch closures (i.e., movements of the stick 14) that occur during the sequence will not cause a new fortune telling sequence to begin; however, the synthesizer 100 will respond to switch closure inputs again once a currently running fortune telling sequence is complete.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A candy holding device for holding a piece of candy attached to a stick, the candy holding device comprising:
    a housing having a message display portion having a plurality of messages associated therewith;
    a source of battery power disposed within the housing;
    a plurality of light sources disposed within the housing such that each of the light sources illuminates one of the messages of the message display portion;
    a holder coupled to the housing and adapted to hold the stick;
    a first contact member coupled to the holder;
    a second contact member disposed within the housing and adjacent to the stick such that a movement of the stick causes an engagement of the first and second contacts; and
    an electronic circuit coupled to the battery, the first and second contact members, and the light sources, wherein the circuit is adapted to randomly illuminate at least one of the light sources to display a message in response to the engagement of the first and second contacts.

2. The candy holding device of claim 1, wherein the holder is mounted to the housing using a spring member.

3. The candy holding device of claim 2, wherein the spring member urges the first contact member to disengage from the second contact member.

4. The candy holding device of claim 2, wherein the spring member is a helical spring.

5. The candy holding device of claim 1, wherein the second electrical contact member comprises a ring-shaped contact surrounding the first contact member.

6. The candy holding device of claim 1, further comprising a speaker disposed within the housing and coupled to the circuit.

7. The candy holding device of claim 6, wherein the circuit is further adapted to drive the speaker to produce sounds in response to the engagement of the first and second contacts.

8. The candy holding device of claim 1, wherein the circuit is further adapted to sequentially illuminate a plurality of the light sources during a first time interval in response to the engagement of the first and second contacts.

9. The candy holding device of claim 8, wherein the circuit is further adapted to randomly illuminate the at least one light source for a second time interval subsequent to the first time interval.

10. The candy holding device of claim 1, wherein the light sources are incandescent bulbs.

11. The candy holding device of claim 1, wherein the message display area comprises a translucent message lens for displaying messages to a user.

12. The candy holding device of claim 1, wherein the plurality of messages comprises at least some textual information.

13. A candy holding device for holding a piece of candy attached to a stick, the candy holding device comprising:
    a housing having a message display portion with a plurality of messages associated therewith;
    a source of battery power disposed within the housing;
    a holder coupled to the housing and adapted to hold the stick;
    a switch disposed within the housing and adjacent to the stick such that a movement of the stick causes an actuation of the switch; and
    an electronic circuit coupled to the battery and the switch, wherein the circuit randomly selects in the message display portion one of the messages in response to the actuation of the switch.

14. The candy holding device of claim 13, wherein the message display portion comprises a plurality of message windows.

15. The candy holding device of claim 14, wherein at least some of the message windows comprise a textual message.

16. The candy holding device of claim 13, wherein the message display portion is oriented toward a user's face during consumption of the candy.

17. The candy holding device of claim 13, further comprising a speaker to produce sounds in response to the actuation of the switch.

18. A candy holding device for holding a piece of candy attached to a stick, the candy holding device comprising:
    a housing having a message display portion that includes a plurality of translucent message display lenses;
    a plurality of light sources disposed within the housing such that each light source is uniquely associated with one from the plurality of message display lenses;
    a source of battery power disposed within the housing;
    a holder disposed within the housing and adapted to hold the stick;
    a switch disposed within the housing and adjacent to the stick such that a movement of the stick causes an actuation of the switch; and
    an electronic circuit coupled to the battery, the switch, and the light sources, wherein the circuit is adapted to randomly illuminate one light source to pass light through the associated message lens to display a message to a user in response to the actuation of the switch.

19. The candy holding device of claim 18, wherein at least some of the messages comprise textual information.

20. The candy holding device of claim 18, further comprising a speaker that produces sounds in response to the actuation of the switch.

* * * * *